United States Patent [19]

Arrington et al.

[11] Patent Number: 4,573,607
[45] Date of Patent: Mar. 4, 1986

[54] TUBE STORAGE AND DELIVERY DEVICE

[75] Inventors: John P. Arrington, San Mateo; Kathleen A. Jaraczewski, Mountain View; Marc F. Moisson, Los Altos; Martin L. Wisecarver, Sonora, all of Calif.

[73] Assignee: Raychem Corp., Menlo Park, Calif.

[21] Appl. No.: 539,848

[22] Filed: Oct. 7, 1983

[51] Int. Cl.$^4$ .................................. B65D 83/00
[52] U.S. Cl. ................................. 221/25; 221/72
[58] Field of Search .............. 221/25, 31, 32, 71–74, 221/96; 222/87

[56] References Cited

U.S. PATENT DOCUMENTS 2,856,185  10/1958  Whipple ............................. 221/73
3,341,066   9/1967  Bowes ............................... 221/25
3,410,450  11/1968  Fortenberry ..................... 221/25 X
3,917,045  11/1975  Williams et al. ................. 221/71 X Primary Examiner—F. J. Bartuska
Attorney, Agent, or Firm—Dennis E. Kovach; Herbert G. Burkard; T. Gene Dillahunty

[57] ABSTRACT

This invention provides an article for storing and dispensing tubes open at two ends and containing materials which are pure or must be protected from the environment or which are present in premeasured amounts. The article of this invention comprises a flexible tape for sealing the ends of the tubes, flexible tape being movable within a case to hold the tubes sealed in the case and discharge the tubes from the case. One embodiment is a cassette for tubes containing adhesive for splicing optical fibers.

6 Claims, 1 Drawing Figure

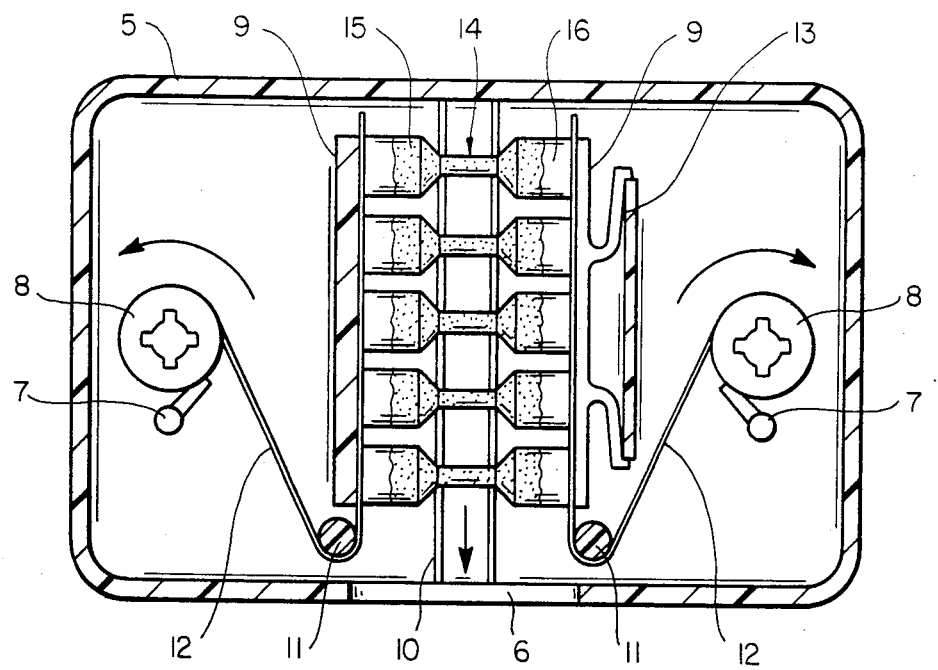
FIG_1

TUBE STORAGE AND DELIVERY DEVICE

BACKGROUND OF THE INVENTION

In a number of areas there is a need to use small amounts of materials which are of a high purity or must be protected from the environment until used. Opening a container to remove a small amount of such material for use exposes the remaining material to the environment or to impurities. In some applications premeasured quantities of materials are needed for automatic processes. In other applications the material is used in place in small containers such as tubes.

In many applications a convenient way to premeasure, protect or use materials is in tubes which are open at both ends. Examples of such tubes are those used for storing and curing adhesives for splicing optical fibers, such as shown in copending applications Ser. No. 464,805, filed Feb. 9, 1983 and Ser. No. 465,362, filed Feb. 10, 1983. The problem presented by such tubes is how to place the proper amount of adhesive in the tube and use it. It is not practical to do this in the field where contamination of the material may occur and where it is impractical to measure the desired amount with precision. In some applications the material must be protected from the environment. For example, some of the optical fiber adhesives are cured by exposure to ultraviolet light. Exposure to light may cause premature curing before the fibers are properly positioned for splicing. Prefilled tubes provide a convenient means for protecting the adhesive from exposure to light until the splice is ready for curing the adhesive.

It is therefore desirable to have means to enable dispensing materials in small tubes under controlled conditions and means for storing the tubes and transporting them to the point of use. It is further desirable to provide means for dispensing the tubes for use in machines or automated processes without exposing the material in the tube to the environment.

DESCRIPTION OF THE INVENTION

This invention provides an article for storing and dispensing tubes which comprise a case containing an elongate flexible means for engaging and sealing the ends of a tube, which elongate flexible means is connected to means for moving said elongate flexible means relative to the case to move the tube within the case and to discharge the tube from the case and which elongate flexible means is in contact with support means to maintain the elongate flexible means against the ends of the tube to seal the ends of the tube and to move the tube. The following description of a specific embodiment of this invention illustrate the device provided by this invention.

FIG. 1 is a view of the internal parts of a device embodying this invention. The device is a cassette-type article having case 5 which is formed in top and bottom parts. FIG. 1 shows the cassette with the top half of the case 5 removed and shows the hour-glass or dog-bone shaped tubes 14 in the cassette.

In this specific embodiment, the elongate flexible means 12 are strips of tape which have a coating of adhesive on the side of the tape facing the tubes 14. The adhesive coating provides a good seal of the ends of tubes 14, but which readily releases from the end of the tube when the tube is discharged from the cassette. The tape strips 12 are positioned between tubes 14 and support members 9, one of which is connected to pressure means 13, such as a spring. Tubes 14 are thereby held in position between tapes 12. Tapes 12 pass around pins 11 and are attached to wheels 8 for pulling the tapes 12. Rachet means 7 prevents the wheels from turning back and relieving the tension on tapes 12. The cassette is used by placing it in a device which has shafts to engage the interior surface of wheels 8 and turn them in syncronization to move tapes 12 at the same speed. Tube 14 is thereby moved past pins 11 and discharged through port 6 in the case as tapes 12 disengage from tube 14 at pins 11. Optional guide 10 is provided in this embodiment to guide tubes 14.

Adhesive 15 in tube 14 fills the center portion of the tube. Air space 16 is provided to prevent adhesive 15 from contacting tape 12. With both ends of the tube 14 sealed with tape 12, adhesive 15 is of sufficient viscosity that it will not flow against tape 12 or through tube 14 to one end.

This embodiment of the invention is particularly adapted for use in automatic machines which dispense the tube from the cassette then use the tube. In this example the cassette case is made opaque, the tube is dispensed into an optical fiber splice box and is thereby protected from exposure to light or impurities until in place with the fibers and cured by a light source in the splice box.

This embodiment is a mere single example of the configuration and application of this invention. It is apparent that other configurations of this invention are readily adaptable to particular needs and that the tubes may be of various configurations and may contain liquids, gases and/or solids.

We claim:

1. An article for storing and dispensing optical fiber splicing tubes containing adhesive for splicing optical fibers, comprising:

a casing;

a plurality of tubes having first and second open ends and containing an adhesive for splicing optical fibers;

first and second flexible tapes;

means for continuously pressing the first and second flexible tapes against the first and second open ends of the tubes to continuously sealingly engage the first and second ends of the tubes within the casing; and means for moving the first and second tapes relative to the casing to dispense individual ones of the tubes.

2. The article of claim 1, the pressing means including means for exerting pressure on the first and second tapes so as to pressingly engage the first and second ends of the tubes within the casing.

3. The article of claim 2, the pressing means comprising a spring.

4. The article of claim 3, the pressing means further comprising first and second ratchets to maintain tension in the first and second tapes.

5. The article of claim 2, the first and second flexible tapes including an adhesive thereon for sealing the first and second ends of the tubes within the casing.

6. The article of claim 1, further comprising a guide for guiding the tubes out of the casing.

* * * * *